United States Patent Office 3,454,144
Patented July 8, 1969

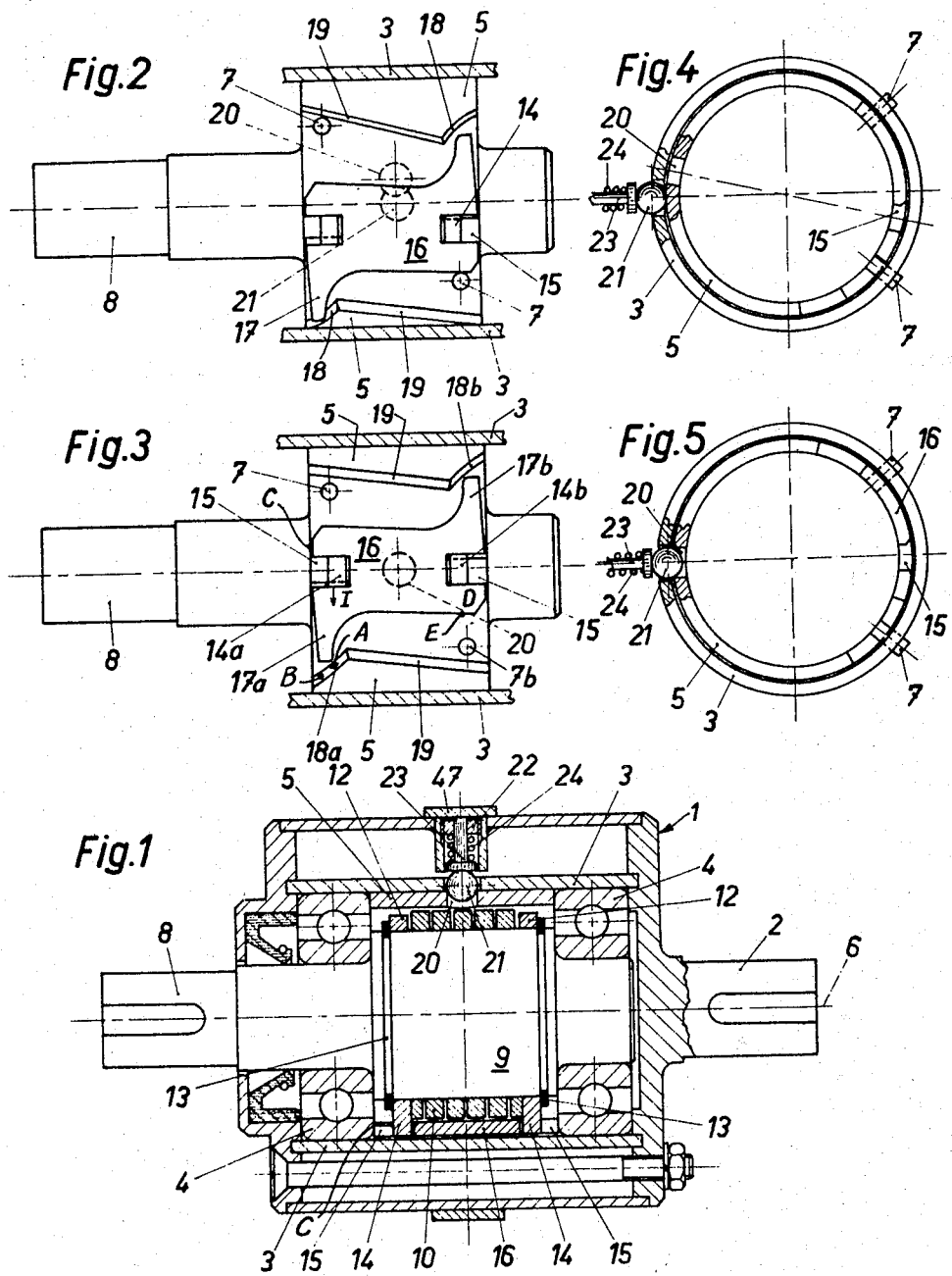

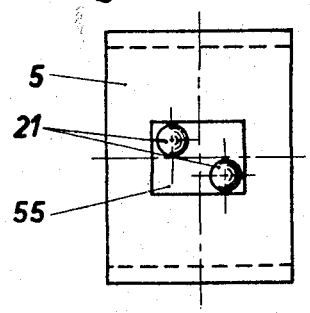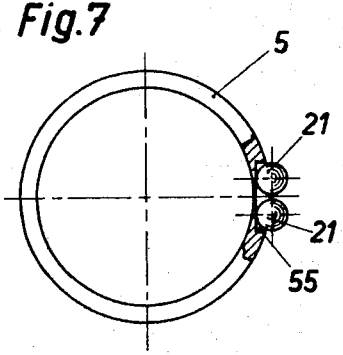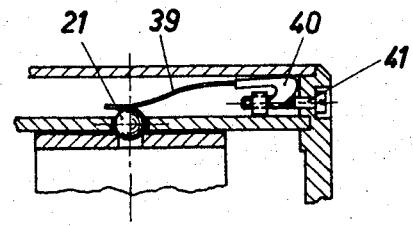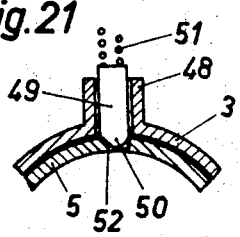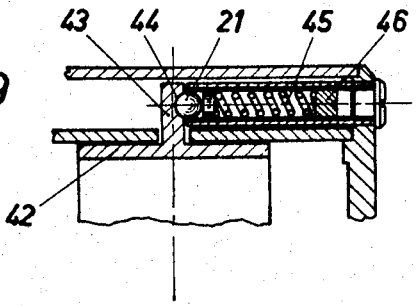

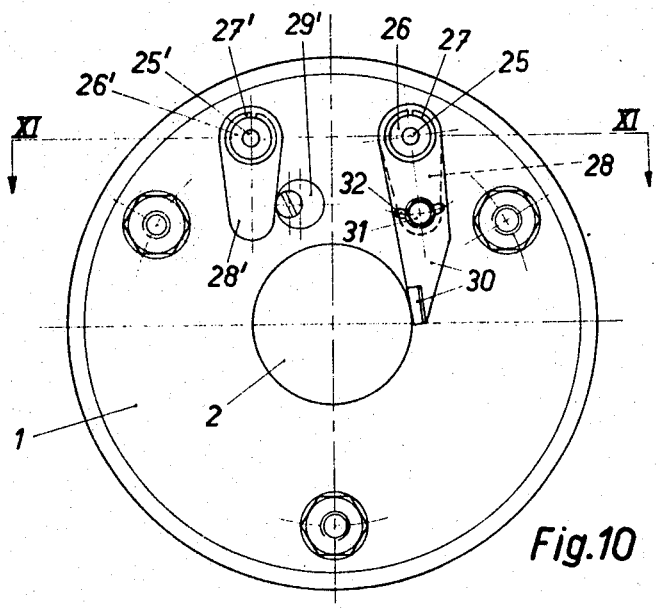
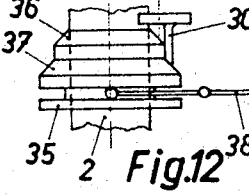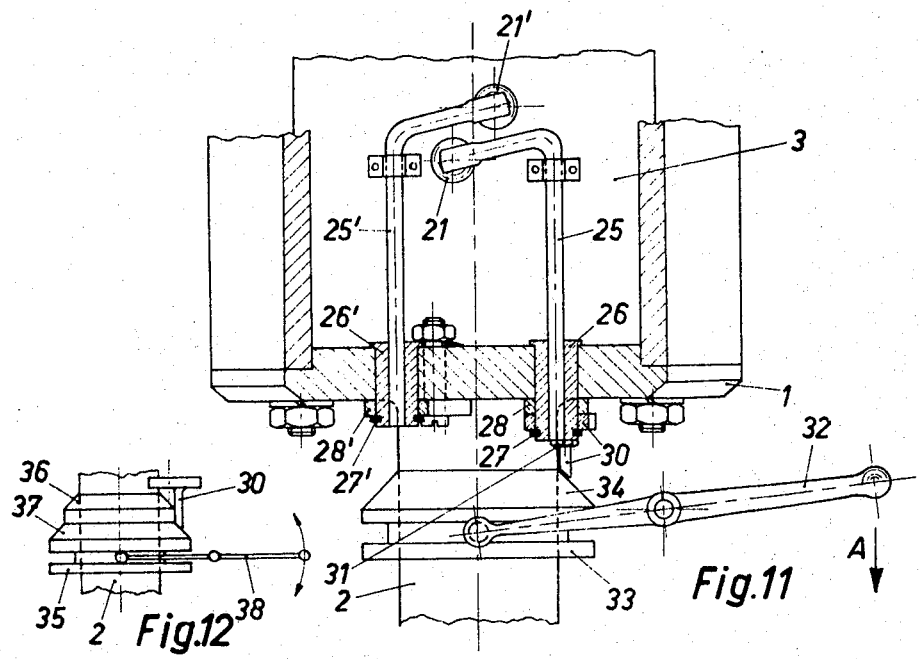

3,454,144
OVERLOAD CLUTCH
Richard Haller, Brauerstrasse 51,
Zurich, Switzerland
Filed Nov. 14, 1967, Ser. No. 682,742
Claims priority, application Austria, Nov. 15, 1966,
2A 10,525/66
Int. Cl. F16d 23/00, 7/02, 43/20
U.S. Cl. 192—56                              8 Claims

ABSTRACT OF THE DISCLOSURE

An overload clutch for the releasable coupling of two shafts has a coiled spring that surrounds one shaft and has its ends in driving connection with a sleeve around the one shaft. A cylinder surrounds the sleeve and comprises a latch that releasably interconnects the cylinder with the sleeve. When one shaft is rotated, the spring will be actuated to engage the one shaft and to drive the sleeve and thereby the second shaft; when the rotational momentum between the shafts becomes too large, the spring will be released from its frictional engagement with the one shaft, for idling.

---

The invention relates to clutches, and relates more particularly to overload clutches of the type for the releasable coupling of two shafts, that includes an overload mechanism. Still more particularly, the invention relates to overload clutches wherein a coiled spring acts as the coupling means transmitting the rotational momentum between the two shafts.

Reference is had to my Patent No. 3,229,544, dated Jan. 18,1966, and to my pending application, Ser. No. 514,510, now Patent No. 3,371,550.

It is among the principal objects of the invention to provide an overload clutch of the type referred to, that initiates the frictional engagement of the coiled spring with the driving shaft in at least one rotational direction, and preferably in both opposite directions; and which causes the release of the frictional engagement and changes it into idling, when the momentum between the two shafts surpasses a maximum value.

It is another object of the invention to provide such an overload clutch, wherein the value of the maximum rotational momentum transmitted may be selectively varied.

Overload clutches have been constructed in the past, but many of these had power transmissions that used friction disks, that require a large amount of space and are subject to wear. Spring actuated overload clutches have also been proposed in the past, but they were for most parts deficient therein that they lacked the momentum for releasing the clamping action of the spring, and/or the uninterrupted transition into idling by the spring upon the occurrence of an undesired overload.

It is accordingly a further object of the invention to provide an overload clutch of the type described, that avoids the aforementioned drawbacks of the prior art.

It is still another object of the invention to provide such a spring controlled overload clutch in which the spring is easily shifted between idling and clamping positions.

It is still a further object of the invention to provide such a coil spring operated overload clutch in which upon occurrence of an overload, to which the clutch has been adjusted, the clamping of the driving shaft by the spring will be self-released and the clamping be converted to idling.

Further objects and advantages of the invention will be set forth in part in the following specification and in part will be obvious therefrom without being specifically referred to, the same being realized and attained as pointed out in the claims hereof.

Generally speaking, the instant invention accomplishes its aims by the provision of a sleeve around the driving shaft, which sleeve has an axial cam surface carrying slot; the end portions of the spring are controlled from that sleeve and cause the shifting of the coiled spring between the idling and clamping positions relative to the driving shaft. The sleeve, on the other hand, is connected by latching means with relation to the driven shaft, and, upon the occurrence of an overload, the latching means release the connection.

For a fuller understanding of the nature and objects of the invention, reference should be had to the following detailed description, taken in connection with the accompanying drawings, in which:

FIG. 1 is an axial sectional view, partly in elevation, of an overload clutch is accordance with an embodiment of the invention;

FIG. 2 is a fragmentary elevational view, partly in section, showing details of some of the parts shown in FIG. 1, followed release of the latching means;

FIG. 3 is a fragmentary elevational view, partly in section, similar to FIG. 2, but showing the parts thereof in position when the latching means are operative;

FIG. 4 is a side elevational view, partly in section, of some of the parts of FIG. 2, shown in the position of FIG. 2;

FIG. 5 is an elevational view, partly in section, similar to FIG. 4, but showing the parts of FIG. 4 in the position of FIG. 3;

FIG. 6 is an elevational view, similar to FIG. 2, but embodying a modification;

FIG. 7 is an end elevational view, partly in section, of the modification of FIG. 6;

FIG. 8 is a fragmentary sectional view showing a further modification;

FIG. 9 is a fragmentary sectional view, similar to FIG. 8, but embodying a still further modification;

FIG. 10 is a front elevational view of a yet further modified detail;

FIG. 11 is a fragmentary sectional view taken on the line XI—XI of FIG. 10;

FIG. 12 is a fragmentary elevational view, showing a further modified detail of FIG. 11;

FIG. 21 is a fragmentary sectional view showing a modified latching mechanism.

Figure 13:
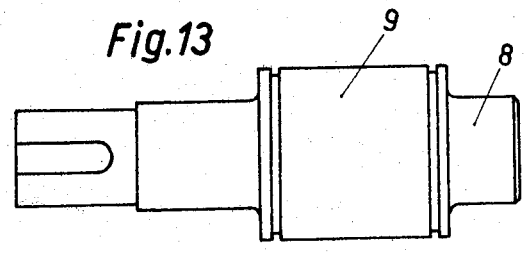
FIG. 13 is a front elevational view of the driving shaft of FIG. 1.
Figure 14:
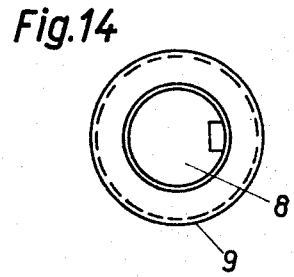
FIG. 14 is an end elevational view thereof.

In carrying the invention into effect, in the embodiments which have been selected for illustration in the accompanying drawings and for description in this specification, and referring now particularly to FIGS. 1-5 and 13-20, there is provided a casing 1 that is secured to a shaft 2. The shaft 2 is coaxial with another shaft 8. For the sake of convenience and clarity, the shaft 8 will hereinafter be referred to as the driving shaft, and the shaft 2 as the driven shaft; but this is merely for the sake of convenience, and it will be understood by the skilled artisan that the mechanism will also work where the roles of these shafts are reversed and the shaft 2 is the driving shaft, and correspondingly, the shaft 8 the driven shaft.

In the casing 1 there is disposed non-rotatably a cylinder 3 that engages the outer rings 4 of two ball bearings. Between these ball bearings, there is disposed a sleeve 5 that is rotatable freely coaxially about the axis 6 of the aligned shafts 2 and 8. The extent of rotational movement of the sleeve 5 relative to the cylinder 3, however, is limited to two extreme angular positions defined by pins 7. One of these extreme positions is shown in FIGS. 2 and 4. The inner rings of the two ball bearings 4 are mounted on the shaft 8.

Figure 15:
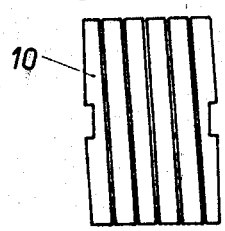
FIG. 15 is an elevational view of the coiled springs of FIGS. 1-3.
Figure 16:
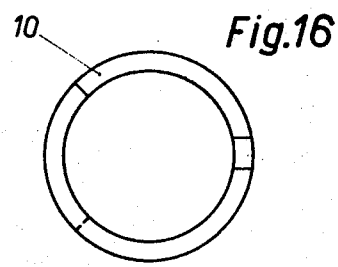
FIG. 16 is an end elevational view thereof.

The end of the shaft 8 is enlarged to form a hub 9. A helical coil spring 10 (see FIGS. 1, 15 and 16) is mounted on the hub 9. The interior diameter of the spring 10 is a little smaller than the external diameter of the hub 9. The end portions or end spirals of the springs 10, as best shown in FIG. 15, are provided with kerfs. A nose 11 (FIGS. 17, 18) which is mounted in a friction disk 12 engages the kerf of each end portion of the spring 10. Thus, there are provided two friction disks 12, and the nose 11 of each engages a kerf of the end portion of the spring 10 adjacent to the respective friction disk 12. The friction disks 12 are journaled on the hub 9. Retaining rings 13 retain axially the spring 10 and the friction disks 12 on the hub 9.

Figure 17:
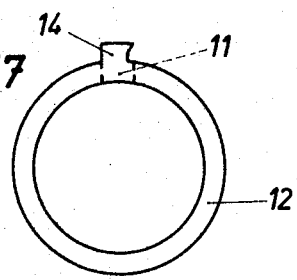
FIG. 17 is an end elevational view of a connecting member shown in FIG. 1.
Figure 18:
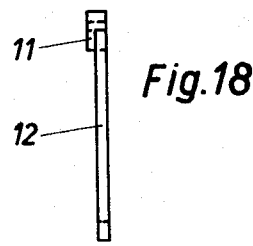
FIG. 18 is an edge elevational view thereof.
Figure 19:
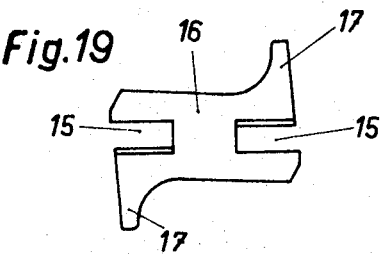
FIG. 19 is an elevational view of a guide member shown in FIGS. 1-3.
Figure 20:
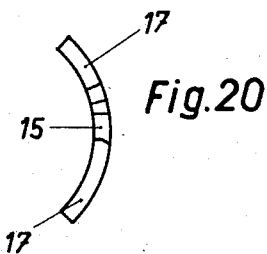
FIG. 20 is an end elevational view thereof.

As best shown in FIGS. 2, 3, and 17, each nose 11 is provided with a hook 14. Each hook 14 is slidingly disposed in a guide 15 of an arcuate guide member 16. As best shown in FIGS. 2, 3, 19, and 20, the guide member 16 is provided with two guides 15 which are arranged axially on the two axial ends of the guide member 16. One of the guides 15 receives slidingly the hook 14 that is assigned to one end portion of the spring 10, while the opposite guide 15 receives slidingly the hook 14 that is assigned to the other end portion of the spring 10.

The guide member 16, in peripheral direction is provided with two opposite cams 17 that can be brought in contact with cam surfaces 18 that are formed along some of the edges of the axial slot of the sleeve 5. The other edges 19 thereof are so arranged that the sleeve 5 may be rotated about the axis 6 until the portion of the guide member 16 that is opposite a cam 17, depending on the sense of direction of rotation of the shaft 8, will make contact with the respective pin 7 that projects from the cylinder 3 (see FIGS. 2, 4).

Thus, the aforesaid axial slot of the sleeve 5 is bounded on each side, in succession, by a cam surface 18 and an edge 19.

Diametrically opposite of the aforesaid axial slot, the sleeve 5 is provided with a bore 20 that forms a receptacle operative for receiving a portion of a ball 21. The ball 21 is shiftably guided in an opening of the cylinder 3 (see FIGS. 1, 4 and 5). Resilient means, such as a spring 24, are provided that acts upon a plunger 23. The spring 24 is adjustable by means of a screw 22 (FIG. 1). An adjustable external ring 47 is provided which is operative to aid the plunger 23 to retain the ball 21 in the bore 20. The ball 21 thus forms a latch, for latching portions of the latching means between the sleeve 5 and the shaft 2, and which includes the bore 20, the cylinder 3 and the casing 1.

In FIGS. 6–12 and 21, there are shown modifications of the latching arrangement, and the power adjustment therefor.

As shown in FIGS. 6 and 7, two balls 21 may be arranged instead of a single ball previously described. Either two separate bores may be assigned for the two balls 21, or a single cutout 55 may be provided instead of the previously described bore, recessed in the sleeve 5, and the two balls 21 are arranged diagonally of the rectangular cutout 55. In this arrangement, one of the balls 21 will operate as a latch in one rotational direction, and the other ball 21 in the opposite rotational direction, and upon the occurrence of an overload torque momentum, the respective ball 21 will be disengaged and will thereby interrupt the power transmission. To each of the two balls 21 there is assigned a separately adjustable spring, so that different maximum torque momenta may be assigned for the two opposite rotational movements. For electro motors, for instance, it is important that clutches connected thereto transmit torques for a short time, which torques are higher than the normally occurring permissive torques.

Such an arrangement of a mechanism that exerts onto the balls different forces is shown in FIGS. 10–12. To each of the balls 21 and 21' there is applied a spring force exerted by a torsion rod 25 and 25', respectively. These torsion rods are secured non-rotatably to the bearing sleeves 26 and 26', respectively. Thus, by turning the bearing, the respective torsion rod may be turned. Adjustment means are provided for adjusting the spring force exerted by the torsion rods. On the bearing sleeve 26' there is mounted rigidly a tongue 28' that is protected by a retaining ring 27'. Thus, by turning the tongue 28', the torsion rod 25' may be turned about its longitudinal axis (see FIG. 11). An eccentric 29' is provided adjacent the tongue 28' and may be adjusted by means of a screw driver. Turning of the eccentric 29 will control the position of the tongue 28', and thereby of the bearing sleeve 26' and the torsion rod 25', thereby adjusting the rotational position of the torsion rods 25' in the casing 1. By this means, there is easily adjusted the spring force exerted onto the ball 21'.

A similar mechanism is provided for the ball 21. The torsion rod 25, similar to the torsion rod 25', is secured for tied rotation with the bearing sleeve 26. The tongue 28 is again provided similarly to the tongue 28', and is protected by means of a retaining ring 27. On the bearing sleeve 26, however, there is furthermore movably arranged a lever arm 30. The position of the tongue 28 may be pre-adjusted by positioning the set screw 31 of the tongue 28 within the arcuate slot 32 of the lever arm 30. Once the position of the tongue 28 has been adjusted relative to the position of the lever arm 30, every movement of the lever arm 30 will automatically provide for rotation about its longitudinal axis of the torsion rod 25.

As best shown in FIG. 11, the lever arm 30 normally disposed near the shaft 2. If the torque transmission is to be increased for a short while, the swing lever 32' may be moved in the direction of the arrow A, whereby there will be lifted in the opposite direction than the direction A, a slip ring 33 that carries a tapered can surface 34. When the slip ring 33 is thus brought closer to the casing 1, the lever arm 30 will be swung together with the tongue 38; and this will result in a stronger tensioning of the torsion rod 25, and accordingly the pressure exerted onto the ball 21 will be increased.

In FIG. 12 there is shown a further modification of the slip ring. The slip ring 35 of the shaft 2 shows two tapered surfaces 36 and 37, which may be engaged by the lever arm 30 as cam follower. During the rotation of the shaft 2, the operation of the lever 38 will change the load exerted on the respective ball. Preferably, the swing levers 32' and 38 may directly be coupled with the switch (not shown) of the electro motor (not shown).

Two separate spring arrangements are shown in FIGS. 8 and 9. In FIG. 8, there is shown a leaf spring 39 that exerts pressure onto the ball 21, and a support for the leaf spring 39 tilts when the screw 31 is tightened, thereby increasing the spring force exerted onto the ball 21.

In accordance with the embodiment of FIG. 9, the sleeve 32 no longer, in contrast to the sleeve 5, carries a bore, but is instead provided with a radial collar 43 which has a groove 44 to receive the ball 21. Also here the load of the spring 45 may be adjusted by means of a screw 46.

In FIG. 21, there is shown a different latch that comprises a pin 49 that is guided in a guide structure 48 which is formed in the cylinder 3. The pin 49 has a hemispherical engaging end 50 one side of which is flattened to provide an inclined end surface. The sleeve 5, on the other hand, has a corresponding cutout 52 that has a matching inclined engaging surface. The pin is pressed adjustably in the direction radially towards the cylinder 5, by means of a spring 51. During latching, the two inclined surfaces are joined, which promotes safety, as well as greater precision in adjustment of the disengagement point. This type of latch is particularly suitable, where the instant overload clutch is used as a friction clutch.

The operation of the above described overload clutch is as follows:

When a torque momentum is applied to the shaft 8, the guide member 16 will make contact on one hand with one of its cams 17 with one of the cam surfaces 18 of the sleeve 5, and on the other hand will make contact with the outer ring of the ball bearing 4. Owing to this, the spring 10 will be held only at one end with the hook 14 assigned thereto, will be choked on to the hub 9, and thus will transmit the torque onto the cam surface 18 with which contact has been made. Furthermore, the guide member 16 will be turned in the sense of rotation of the shaft 8, and thus will support the clamping power of the clutch spring 10.

The torque that is exerted from the sleeve 5, by means of the cam 17 and the cam surface 18, is transmitted to the shaft 2 by means of the ball 21 that is received in the bore 20, and the cylinder 3, at the ball 21 interconnects the sleeve 5 and cylinder 3. Thus there will be established torque transmission between the two shafts 8 and 2.

If the torque momentum increases, for instance, due to braking of the driven shaft 2, and this increase surpasses a pre-set value, the ball 21 will be pushed out of the bore 20. At this instant, with the latching means released, the sleeve 5 may be rotated about the axis 6. This rotation will proceed until the respective portion of the guide member 16 makes contact with the respective pin 7. This contact will bring about that the other end portion of the spring 10 and the hook 14 assigned thereto will be arrested, and no longer the first end portion and its hook 14 that had been held due to the contact between the cam 17 and the cam surface 18 prior to the release of the latching means by the expulsion of the ball 21 from the bore 20.

As the sleeve 5 may be turned about the axis 6 in the aforesaid manner and instant, sufficiently until the cam surface 18 is disengaged from the cam 17, the spring 10 may be unrolled, thus releasing the clamping almost completely. The shaft 8 may now rotate freely, without transmitting torque to the driven shaft. By turning in the opposite direction, the ball 21 may again be brought into the bore 20 (44), re-establishing the torque transmission.

The operation described in the foregoing, may be applied in either rotational direction.

To facilitate the understanding of the operation, all the parts near the side of the one end of the spring 10 are assumed for the purpose of this additional explanation to be on the left side of FIG. 3, and the reference numerals thereof to have suffixes "a," and the parts near the other side of the spring 10 on the right hand side (FIG. 3) provided with suffixes "b." Furthermore, the point where the member 16 makes contact with the outer ring of the ball bearing 4 is indicated at "C," the point of contact with the pin is indicated as "E" and forms a portion of the edge of the right hand part "D" of the member 16. Lastly, the cam surface 18a has two position points "A" and "B."

In the instant when the shaft 8 commences to rotate, the one end 14a of the spring 10 will drive the guide member 16 in the direction of the arrow I. The guide member 16 will move in the direction I until its cam 17a makes contact with the cam surface 18a of the sleeve 5, at the point "A" thereof. As the member 16 is further driven in the direction I, the cam 17a will move on the cam surface 18a from the position "A" to the position "B." During that movement, however, the member 16 cannot move axially to the left (FIG. 3) as at the point "C" it bears against the outer ring of the ball bearing 4. The guide member 16 therefore will perform a swinging or turning movement about the point "C." Due to the aforesaid swinging or turning movement about the point "C," the part "D" of the member 16 furthermore will take along the other end portion 14b of the spring 10, and thereby there will be increased the power transmission connection of the spring 10 wound on the shaft 8. The clutch is thus in full operation.

Upon the occurrence of an overload the cam 17a will press stronger onto the cam surface 18a of the sleeve 5 until the sleeve 5 moves away from under the ball 21. The guide member 16 and the sleeve 5 thereupon rotate in the direction I until the guide member 16 makes impact contact with its point "D" against the pin 7b. This impact between the guide member 16 and the pin 7b will release the one end 14a of the spring 10, because at this instant the other end 14b of the spring 10 will be blocked. Thus, the spring 10 will be relaxed and its clamping action released sufficiently for idling.

By shaping the raceway of the ball 21 suitably, a self-returning by the ball 21 may be avoided.

As even after cessation of the torque transmission there will remain a minimal friction between the spring 10 and the hub 9, the entire mechanism may after a long period of idling be subject to the occurrence of heat. This heat may cause a rise in pressure within the casing 1, and this rise in pressure may, for instance by means of a membrane or the like, be used to operate an electric switch to activate an alarm.

I wish it to be understood that I do not desired to be limited to the exact details of construction shown and described, for obvious modifications will occur to a person skilled in the art.

Having thus described the invention, what I claim as new and desired to be secured by Letters Patent, is as follows:

1. An overload clutch, for use with two shafts aligned along an axis of rotation, said clutch being operable for interconnecting said shafts for transmitting therebetween torque about said axis and, respectively, actuatable to interrupt the interconnection when the torque momentum surpasses a predetermined selectively variable value, said clutch comprising:

a sleeve rotatable coaxially about one of said shafts and defining an axial slot having at least one cam surface, a spring surrounding the exterior of said one shaft and being operative to be idling and, respectively, to clamp said one shaft, said spring having two end portions, one of said end portions being operable to be put in driving engagement with said cam surface whereby said spring will be actuated to engage releasably frictionally the exterior of said one shaft sufficiently for clamping it thereby to establish a driving connection between said sleeve and said first shaft, latching means releasably establishing a driving connection between said sleeve and said second shaft, whereby said second shaft will be in driving connection with said first shaft, said latching means being adjustable for selectively varying the maximum torque momentum transmitted, beyond which said latching means will be released, said sleeve being turnable relative to said second shaft between two extreme opposite angular positions and being turned by said spring into an extreme position when said latching means is released, said sleeve in said extreme position acting on said other end portion of said spring thereby releasing said spring at least to a major extent from its frictional engagement with said one shaft, for idling.

2. An overload clutch, as claimed in claim 1, said axial slot having two cam surfaces, a friction disk disposed adjacent each end portion of said spring, a guide member disposed in said axial slot of said sleeve and having two opposite peripheral cams and two opposite axial ends, each cam being operable to engage a cam surface of said slot, each friction disk connecting an end portion of said spring with an axial end of said guide member, whereby one of said cams will engage the respective cam surface of said slot and said guide member will actuate said spring to clamp said one shaft, and thereupon said guide member will be in driving connection with said one shaft and with said sleeve until the release of said latching means, said latching means comprising a hollow cylinder secured to said second shaft and surrounding said sleeve and a latch resiliently biased for releasably interconnecting said cylinder with said sleeve, and limiting means between said sleeve and said cylinder defining said extreme positions.

3. An overload clutch, as claimed in claim 2, said latch including a shiftable ball, said cylinder establishing means for guiding said ball during shifting movement thereof, said sleeve defining a receptacle operative for receiving a portion of said ball, and resilient means urging said ball to be shifted into said receptacle thereby interengaging said cylinder and said sleeve.

4. An overload clutch, as claimed in claim 2, said latch comprising two shiftable balls, said cylinder establishing means for guiding said balls during shifting movement thereof, said sleeve defining a rectangular cut-out operative for receiving a portion of each ball, said balls being positioned diagonally relative to said cut-out, and resilient means urging said balls to be shifted into said cut-out thereby interengaging said cylinder and said sleeve.

5. An overload clutch, as claimed in claim 4, said resilient means exterting a seperate spring force for each ball, each spring being adjustable independently of the other.

6. An overload clutch, as claimed in claim 2, said latch including a pin having near one end an inclined surface, said cylinder defining a guide structure for said pin, resilient means urging said pin longitudinally in a direction towards said one end, said sleeve defining a receptacle positionable opposite said one end of said pin for receiving said one end thereof and having a matching inclined surface engaging said inclined surface of said pin when said pin is pressed by said resilient means into said receptacle.

7. An overload clutch, as claimed in claim 2, resilient means operable for biasing said latch comprising a torsion rod, journalling means secured to said torsion rod and turnable therewith, and adjusting means operable for adjusting the spring force exerted by said torsion rod onto said latch comprising an eccentric operable to turn said journalling means to a selectively variable predetermined position.

8. An overload clutch, as claimed in claim 2, resilient means operable for biasing said latch comprising a torsion rod, and adjusting means operable for adjusting the spring force exerted by said torsion rod onto said latch comprising a movable cam, a lever in torque driving connection with said torsion rod disposed adjacent said cam and being operative to act as a cam follower, and moving actuatable for moving said cam to engage said extension, whereby said cam will move said lever for adjusting the torque momentum transmitted by said torsion rod.

References Cited

UNITED STATES PATENTS

| | | |
|---|---|---|
| 840,847 | 1/1907 | Henrici. |
| 2,541,947 | 2/1951 | Starkey. |
| 2,595,213 | 4/1952 | Raynor. |
| 3,335,835 | 8/1967 | Conlon. |

CARLTON R. CROYLE, *Primary Examiner.*

ALLAN D. HERRMANN, *Assistant Examiner.*

U.S. Cl. X.R.

192—41, 48.3, 81